US012697695B2

(12) United States Patent
Udovcic et al.

(10) Patent No.: US 12,697,695 B2
(45) Date of Patent: Aug. 4, 2026

(54) MOBILE DEVICE FOR MACHINING A WORKPIECE

(71) Applicant: DBM MOBILE FEINSTBEARBEITUNG GMBH, Wuerselen (DE)

(72) Inventors: Marko Udovcic, Wuerselen (DE); Nebojsa Udovcic, Wuerselen (DE)

(73) Assignee: DBM MOBILE FEINSTBEARBEITUNG GMBH, Wuerselen (DE)

( * ) Notice: Subject to any disclaimer, the term of this patent is extended or adjusted under 35 U.S.C. 154(b) by 961 days.

(21) Appl. No.: 17/581,948

(22) Filed: Jan. 23, 2022

(65) Prior Publication Data

US 2022/0219272 A1     Jul. 14, 2022

Related U.S. Application Data

(63) Continuation of application No. PCT/EP2020/025385, filed on Aug. 28, 2020.

(30) Foreign Application Priority Data

Aug. 28, 2019    (DE) .......................... 102019123119.1

(51) Int. Cl.
| | |
|---|---|
| *B23C 3/05* | (2006.01) |
| *B23Q 5/04* | (2006.01) |
| *B23Q 9/00* | (2006.01) |

(52) U.S. Cl.
CPC .............. *B23Q 9/0007* (2013.01); *B23C 3/05* (2013.01); *B23Q 5/04* (2013.01)

(58) Field of Classification Search
CPC .......... B23C 3/05; B23C 3/051; B23C 3/053; B23C 3/055; B23C 3/056; B23C 3/058; B23C 2215/242; B23Q 9/0007; B23B 5/16; B23B 5/161; B23B 5/162; B23B 5/163; B23B 2215/242
See application file for complete search history.

(56) References Cited

U.S. PATENT DOCUMENTS

| | | | | |
|---|---|---|---|---|
| 1,088,945 | A | * | 3/1914 | Troutman .................. B23C 3/05 |
| | | | | 408/83.5 |
| 3,772,944 | A | * | 11/1973 | Becker ...................... B23B 3/26 |
| | | | | 82/113 |

(Continued)

FOREIGN PATENT DOCUMENTS

| | | | | |
|---|---|---|---|---|
| DE | 60000215 T2 | 8/2000 | | |
| EP | 1314501 A1 | * | 5/2003 | ............. B23C 3/055 |

(Continued)

*Primary Examiner* — Ryan Rufo
(74) *Attorney, Agent, or Firm* — Von Rohrscheidt Patents

(57) ABSTRACT

A mobile device for machining a workpiece, the mobile device including a shaft rotatable about a rotation axis; a carriage rotatable with the shaft about the rotation axis and axially, or radially displaceable relative to the rotation axis; a tool support for a cutting tool, the tool support connected to the carriage and displaceable along a carriage axis and in a direction perpendicular to the carriage axis; and a transmission that couples the shaft to the tool support and the carriage so that the tool support is displaceable along a path that includes an axial and a radial movement component relative to the shaft.

4 Claims, 10 Drawing Sheets

(56)                    References Cited

U.S. PATENT DOCUMENTS

|  |  |  |  |  |
|---|---|---|---|---|
| 4,277,210 | A * | 7/1981 | Murray | B23B 3/265 |
|  |  |  |  | 82/131 |
| 4,411,178 | A * | 10/1983 | Wachs | B23B 5/162 |
|  |  |  |  | 82/131 |
| 4,543,861 | A * | 10/1985 | Kwech | B23B 5/162 |
|  |  |  |  | 82/128 |
| 4,758,121 | A * | 7/1988 | Kwech | B23Q 9/0021 |
|  |  |  |  | 408/81 |
| 5,775,188 | A * | 7/1998 | Strait | B23B 3/265 |
|  |  |  |  | 82/131 |
| 9,963,950 | B2 * | 5/2018 | Gilmore | E21B 19/002 |
| 10,010,995 | B2 * | 7/2018 | Sugitani | B23C 3/056 |
| 10,239,132 | B2 * | 3/2019 | Withey | F01D 25/285 |
| 11,052,467 | B2 * | 7/2021 | Rynkowski | B23B 29/025 |
| 2001/0018012 | A1 * | 8/2001 | Harmand | F02F 7/0031 |
|  |  |  |  | 408/1 R |
| 2002/0078803 | A1 * | 6/2002 | Weber | B23B 5/162 |
|  |  |  |  | 82/128 |
| 2003/0059266 | A1 | 3/2003 | Harmand |  |
| 2008/0060490 | A1 * | 3/2008 | Sorensen | B23B 29/022 |
|  |  |  |  | 82/1.11 |
| 2008/0152443 | A1 * | 6/2008 | Harmand | B23Q 17/20 |
|  |  |  |  | 408/116 |
| 2011/0179933 | A1 * | 7/2011 | Ahn | B23B 5/162 |
|  |  |  |  | 83/745 |

FOREIGN PATENT DOCUMENTS

|  |  |  |  |  |  |
|---|---|---|---|---|---|
| EP | 2644301 | A1 * | 10/2013 | ....... | B23B 29/03435 |
| FR | 2751901 | A1 | 2/1998 |  |  |
| WO | WO9952664 | A1 | 10/1999 |  |  |
| WO | WO0176795 | A1 | 10/2001 |  |  |
| WO | WO03008137 | A2 | 1/2003 |  |  |

* cited by examiner

MOBILE DEVICE FOR MACHINING A WORKPIECE

RELATED APPLICATIONS

This application is a continuation of International Patent Application PCT/EP2020/025385 filed on Aug. 28, 2020 claiming priority from German Patent Application DE 10 2019 123 119.1 filed Aug. 28, 2019, both of which are incorporated in their entirety by this reference.

FIELD OF THE INVENTION

The invention relates to a mobile device for machining a workpiece,

BACKGROUND OF THE INVENTION

The mobile device according to the invention is particularly suited for chipping machining of a work piece to be provided with a circular arc shaped surface contour. Thus, the device can be used for chipping machining of any type of work piece, thus e.g., for processing a metal work piece as well as a wooden work piece. The device is also suitable for chipping machining of a non-machined work piece as well as for finishing a surface that has been previously machined.

The mobile device according to the invention is useable e.g; for machining valve seats. Valve seats are typically configured trumpet shaped, including a surface contour of the valve that is oriented towards an interior and configured circular arc shaped. Typically, the valve seats have to be refinished after a certain time period. For large size valves used e.g. in power plants, removing the valves and transporting them to a shop is complex and expensive. Therefore, mobile devices are typically used to finish the valve seats in place.

Known mobile devices thus operate driven by computerized numeral control (CNC). These devices typically include individually controllable motors that facilitate moving a cutting tool along a preprogrammed path in a direction of plural typically perpendicular axes. A device of this type is disclosed in FR 2 751 901 A1 which describes a device for machining valve seats including a machining tool that is movable by two separately controllable positioning devices. This way the desired contour of the valve seat becomes achievable.

DE 600 00 215 T2 describes a device for machining valve seats. The valve seats are machined by a cutting tool which includes an end contour corresponding to a desired contour of the valve seat, therefore a separate tool contour is required for each valve contour.

Typically, devices of this general type are expensive. Furthermore, it has proven to be a problem that the programmable devices can only be operated by trained personnel that is familiar with CNC programming. Therefore, operators have to be trained before using the device. Therefore, there is long felt need for a mobile device, that is operable without programming skills and that facilitates machining a multitude of possible work piece contours.

BRIEF SUMMARY OF THE INVENTION

Thus, it is an object of the invention to provide a mobile device which is simple to handle and facilitates freedom to machine different work pieces.

Improving upon the devices recited supra the object is achieved by a mobile device for machining a workpiece, the mobile device including a shaft rotatable about a rotation axis; a carriage rotatable with the shaft about the rotation axis and axially displaceable along the rotation axis; a tool support for a cutting tool, the tool support connected to the carriage and displaceable in a direction perpendicular to the rotation axis; and a transmission that couples the shaft to the tool support and the carriage so that the tool support is displaceable along a path that includes an axial and a radial movement component relative to the shaft.

The device according to the invention has many advantages. In particular, the device is operable without any programming knowledge. This advantageously reduces training time of an operator of the device. The mobile device only has a small number of components and thus can be transported in a particularly simple manner and can also be disassembled simply and quickly.

The coupling of the shaft with the tool support and the carriage described supra furthermore facilitates moving the tool support and thus the cutting tool along a path that is configured to machine the work piece so that a surface contour of the work piece is configured as a circular arc in cross section. The carriage and the tool support connected therewith perform a rotating movement about the rotation axis of the shaft. When the carriage is axially movable along the rotation axis of the shaft the cutting tool connected with the tool support is movable on a path that is determined by a distance between the rotation axis of the shaft and the cutting tool. Due to the coupling of the shaft with the carriage of the device that is movable axially along the rotation axis an axial movement component of the cutting tool is facilitated in a direction of the rotation axis of the shaft.

In an embodiment where the carriage is radially movable with respect to the rotation axis of the shaft the cutting tool is movable on a path that is determined by a displacement of the cutting tool along the rotation axis of the shaft. Due to the coupling of the shaft with the carriage that is radially movable relative to a direction of the rotation axis of the shaft a radial movement component of the cutting tool with respect to the rotation axis of the shaft is facilitated.

It is also conceivable that the carriage is movable with a radial and an axial component with respect to the rotation axis of the shaft. Put differently the carriage is movable in this embodiment at a slant angle relative to the rotation axis of the shaft. Overall, the tool support is also movable in this case with an axial and a radial component along the path relative to the shaft.

The device according to the invention can thus be used for machining a work piece configured as a valve. Advantageously the rotation axis of the shaft corresponds to a longitudinal axis of a work piece, thus the shaft is aligned centric and parallel to a longitudinal axis of the valve. In an operating condition of the device the cutting tool, e.g. a turning steel is moved along a path. Thus, it is advantageously provided that the shaft is coupled with the tool support and the carriage so that the cutting tool moves along a circular path in a plane that is parallel to the shaft, wherein the circular path is transferred to the work piece to be machined. Advantageously, the device according to the invention facilitates producing a concave as well as a convex surface contour of the work piece to be machined.

By the same token the device according to the invention is also configured to machine a flange or a diffusors where faces have to be machined so that the faces are circular in a cross section along a symmetry access of the flange.

In any case it can be particularly advantageous when the rotation axis of the tool corresponds to a longitudinal axis of a work piece. This way the work piece can be machined rotation symmetrical with respect to the rotation axis. In particular when machining a valve seat or a flange it can be advantageous when the shaft is arranged within the work piece and the rotation axis of the shaft corresponds to or coincides with the longitudinal axis of the work piece.

According to another embodiment of the invention the transmission is a mechanical transmission and/or the coupling between shaft, tool support and carriage is a forced coupling. A mechanical transmission facilitates mechanically transposing a predetermined path of the cutting tool by the device without computer-based control. Thus, it has become apparent that the mechanical configuration of the transmission is particularly advantageous with respect to a simple handling of the device. Thus, acquiring programming skills that are required for operating known devices is redundant. By the same token operator errors due to programming errors can be precluded for the device. Furthermore, also replacing components of the device e.g: due to wear is simpler and more economical since no electronic components (actuators, sensors and controllers etc.) are being used. When configuring a forced coupling of the shaft, the tool support and the carriage a common drive can be used for operating the device.

According to an advantageous embodiment of the invention, the transmission includes a lever arrangement and/or a slotted link and/or gears, and/or traction devices. It has become apparent that the coupling of the shaft with the tool support and the carriage can be performed in a particularly simple manner by a lever arrangement and/or a slotted link and/or by gears and/or traction devices. In any case the coupling is performed purely mechanically so that no programming skills of the operator of the device are required to operate the device. Additionally, the components recited supra can be replaced particularly easily when worn.

In particular when using a slotted link, the cutting tool can be moved along any path wherein the path is predetermined by the slotted link. This can facilitate e.g: to turn a tulip shape into a surface. In particular when machining tubular sections fabricating tulip shapes is often required. Essentially a tulip shape is a transition that is essentially semi-circular. When machining the tubular section, the tulip is to be machined into a face of the typically rotation symmetrical work piece so that the work piece is provided with a circular transition along a circumference of the work piece. Thus, it can be particularly advantageous when the tulip is arranged in a center portion of the face and adjacent portions are arranged at an angle of less than 90 degrees with reference to the longitudinal axis of the work piece. This contour can be transferred to the work piece by a slotted link.

Advantageously the mobile device can include a support block that is connected torque proof to the shaft wherein the transmission is linked at the support block. The support block advantageously cooperates with the carriage of the mobile device. Advantageously the support block functions as a fixed point wherein the carriage is moved relative to fixed point by the transmission in an axial and/or radial direction relative to the shaft.

According to an advantageous embodiment of the invention at least one connection lever is provided which is rotatably coupled with the support block and also rotatably coupled with the tool support so that the tool support moves along a circular path viewed in a plane that is parallel to the shaft wherein a center of the circular path is a first axis of rotation of the connection lever at the support block and wherein a radius of the circular path corresponds to a distance between an axis of rotation of the connection lever and a second axis of rotation of the connection lever at the tool support.

Advantageously the mobile device facilitates chipping machining of the work piece so that the work piece has a circular arc shaped surface contour in a sectional view parallel to the shaft wherein the circular arc shaped surface contour corresponds to the path traveled by the tool holder. Thus, the mobile device is particularly suited for chipping machining of valve seats and flanges and diffusers.

The radius is particularly advantageously adjustable by adjusting the distance described supra. It is conceivable for example that the connection lever includes a groove for this purpose. However, it is also conceivable that the radius is adjusted by adjusting a length of the connection lever.

According to an advantageous embodiment of the invention the tool support is connected to the carriage by a linear support. The linear support advantageously cooperates with the connection lever of the mobile device described supra. A particularly advantageous embodiment of the device according to the invention provides that two support rods of the linear support of the tool support are respectively arranged at one side of the shaft and at an opposite side of the shaft.

Advantageously, the linear support is connected with the connection lever so that the movement of the carriage in the axial and/or the radial direction of the shaft is transferred to the connection lever due to the coupling of the carriage with the linear support.

Another embodiment of the invention provides a groove that extends in the axial direction of the shaft wherein a coupling element of the carriage and/or of the support block engages the groove so that a torque proof connection is provided. Advantageously a controlled movement of the tool support is provided relative to and in a direction of the carriage axis which is exclusively predetermined by the rotating movement of the shaft.

Another advantageous embodiment of the invention provides a spindle that cooperates with a threaded nut that is connected with the carriage, wherein the spindle advantageously extends parallel and/or radially relative to the shaft and is rotatable about its own longitudinal axis so that a relative movement of the carriage with respect to the shaft in an axial and/or radial direction of the shaft is generatable. Thus, an advantageous embodiment of the invention includes a coupling device that couples the spindle to the shaft so that a rotating movement of the spindle is generatable from the rotating movement of the shaft.

Advantageously the coupling of the spindle with the shaft is a forced coupling. Advantageously the movement of the tool support along the path can be controlled by a multistage coupling of the individual components which is controlled exclusively by the rotating movement of the shaft. A size of the relative movement of the carriage with respect to the shaft is thus adjustable by the coupling element so that a precision of the path to be traveled by the cutting tool is variable. Thus, the spindle can perform a partial revolution caused by a full revolution of the shaft. It is also conceivable that the spindle performs a full revolution caused by the full revolution of the shaft. The coupling of the carriage with the linear support of the tool support which is also coupled with the connection lever facilitates adjusting the radial movement component of the cutting tool as a function of the relative movement of the carriage.

According to an advantageous embodiment of the invention the carriage and/or the support block are assembled from two half shells which respectively envelop approximately half of the shaft and which are connected by disengagable fasteners.

Advantageously the carriage and/or the support block are removable from the shaft in a particularly simple manner and/or mountable on the shaft in a particularly simple manner. It is also conceivable that the carriage and/or the support block are provided with a pass-through bore hole into which the shaft is insertable. It is appreciated that simple assembly of the device is very advantageous for transporting the device to a job site.

According to another embodiment of the invention, the device includes a rotating arm that is connected torque proof with the shaft, wherein a longitudinal axis of the rotating arm is advantageously oriented perpendicular to the shaft. Thus, it can be particularly advantageous when the carriage and/or the tool support are movable along the longitudinal axis of the rotating arm. This embodiment is particularly suitable for a movability of the carriage in a radial direction relative to the rotation axis of the shaft. Thus, it can be particularly advantageous when the spindle runs parallel to the pivot arm. Advantageously the spindle is then coupled with the carriage so that a rotating movement of the shaft causes a linear displacement of the carriage along the longitudinal axis of the pivot arm so that the radial movement component of the tool support is generated while the axial movement component of the tool support is advantageously caused by the coupling with the connection lever.

BRIEF DESCRIPTION OF THE DRAWINGS

The invention is subsequently described based on two embodiments with reference to drawing figures, wherein.

DETAILED DESCRIPTION OF THE INVENTION

The first embodiment of the invention illustrated in FIGS. 1-4 includes a first mobile device 1 according to the invention.

Figure 1:
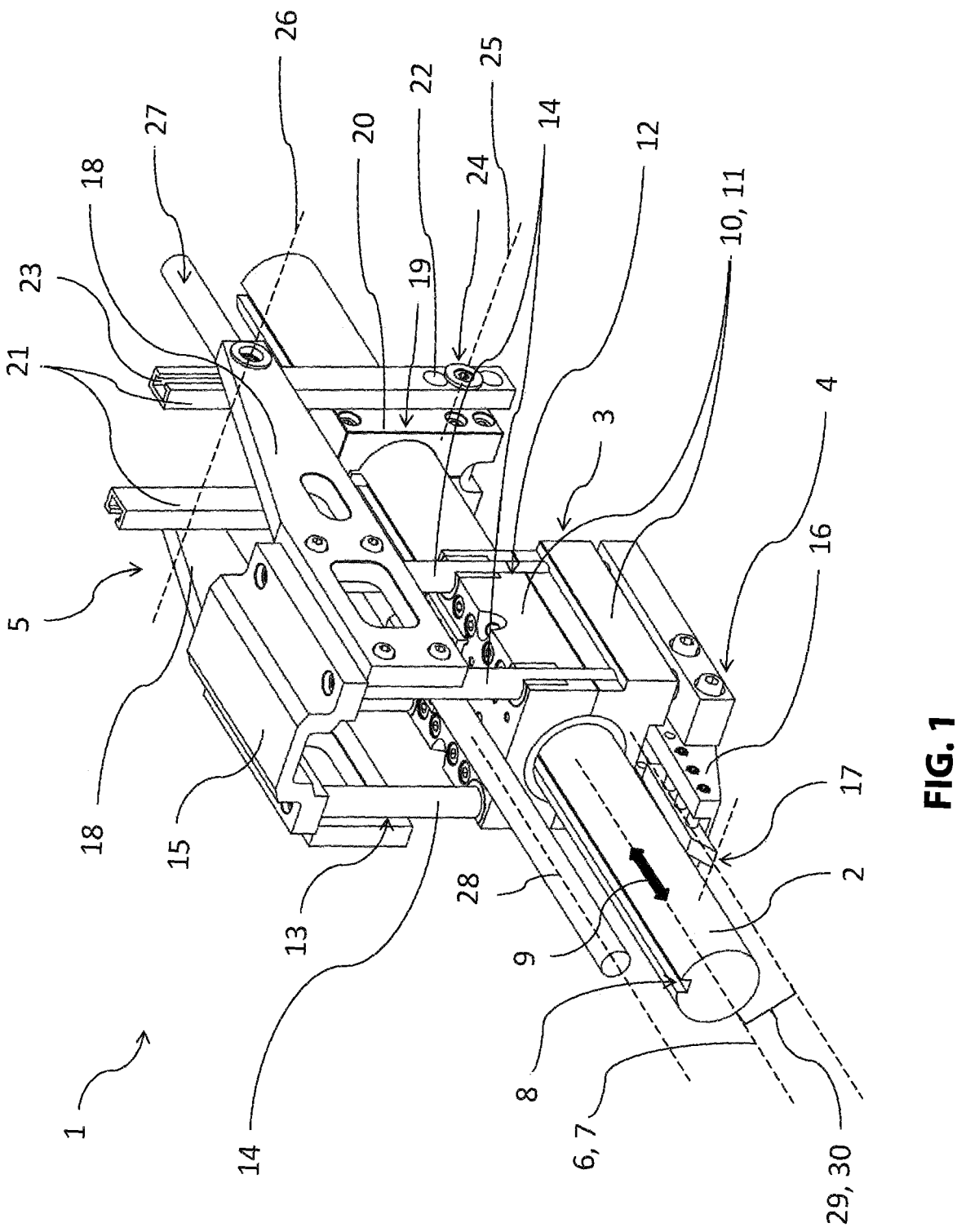
FIG. 1 illustrates a perspective view of the device according to the invention.

FIG. 1 illustrates a perspective view of the device 1. The device 1 includes a shaft 2, a carriage 3, a tool support 4 and a transmission 5.

The shaft 2 of the device 1 is rotatable about a rotation axis 6 which also forms a longitudinal axis 7 of the shaft 2 and provided with a groove 8 at a top side wherein the groove extends in an axial direction 9 of the shaft 2.

The carriage 3 of the device is assembled from the two half shells 10, 11 which are respectively provided with two pass through bore holes 12 in a portion that is oriented away from the shaft 2. The half shells 10, 11 of the carriage 3 respectively envelop half of the shaft 2 and are disengageably connected by fastening bolts. Thus, the carriage 3 is displaceable in the axial direction 9 of the shaft 2. One of the half shells 10, 11 of the carriage 3 is provided with a coupling element at an inside. Due to an engagement of the coupling element in the groove 8 of the shaft 2, the carriage 3 is connected torque proof with the shaft 2.

The tool support 4 includes a receiving element 16 which includes a cutting tool 17 configured as a turning steel configured for machining metal. Thus, the tool support 4 is movable along a carriage axis 47 and in a direction perpendicular to the carriage axis 47. Thus, the carriage axis 47 corresponds to the rotation axis 6 of the shaft 2.

The transmission 5 of the device 1 includes a linear support 13 and two connection levers 21. The linear support 13 in turn includes four support rods 14. Thus, the support rods 14 are respectively supported by two coinciding pass through bore holes 12 of the half shells 10, 11 of the carriage 3. The tool support 4 and a support plate 15 are respectively arranged at ends of the support rods 14. Each of the connection levers 21 respectively includes three pass through bore holes 22 at an end whereas the other end is provided with a groove 23. The transmission 5 furthermore includes two transmission elements 18 which are respectively connected at two adjacent support rods 14 on both sides of the shaft 2 by bolts.

The device 1 further includes a support block 19 which is also assembled from two half shells 20 that substantially envelop half of the shaft 2 respectively and which are connected with each other in a disengageable manner by connection elements configured as bolts. The support block 19 is attached at the shaft 2 so that the half shells 20 of the support block 19 are arranged at the shaft 2 approximately perpendicular to the half shells 10, 11 of the carriage 3.

The connection levers 21 are rotatably coupled with the support block 19 and rotatably coupled with the transmission element 18 of the transmission 5. Thus, the connection levers 21 are respectively rotatably coupled with a half shell 20 of the support block 19 by a bolt 24 that is supported by one of the pass-through bore holes 22 of the connection lever 21. Thus, each half shell 20 is provided with a groove into which a sliding block is inserted. A bushing is inserted through the pass-through bore hole 22. Thus, the bushing is inserted flush into the pass-through bore hole 22 down to a protruding collar. The bolt 24 is run through the bushing and bolted together with a sliding block. A first rotation axis 25 of the connection lever 21 is formed by a longitudinal axis of the bolt 24.

A T-bolt is respectively inserted into the groove 23 of each connection lever 21 wherein the T-bolt is bolted into a blind rivet nut. The transmission elements 18 of the transmission 5 are also provided with a pass-through bore hole wherein a diameter of the pass-through bore hole approximately corresponds to a diameter of the blind rivet nut. Placing the transmission element 18 onto the blind rivet nut forms a straight bearing which provides a rotatable coupling of the connection levers 21 with the transmission elements 18 whose rotation axis 26 runs parallel to the first rotation axis 25 of the connection lever 21.

The device 1 further includes a spindle 27 that runs parallel to the shaft 2 rotatable about a longitudinal axis 28 of the spindle 27. The spindle 27 cooperates with a nut that is arranged at a top side of a half shell 10 of the carriage 3. The spindle 27 is coupled with the shaft 2 by accordingly configured devices so that the spindle 27 also performs a rotating movement due to the rotating movement of the shaft 2.

In an operating condition of the device 1 the shaft 2 is caused by a drive to rotate. Due to the torque proof connection of the carriage 3 and of the support block 19 at the shaft 2, all components rotate about the rotation axis 6 of the shaft 2. Thus, the tool support 4 and the cutting tool 17 move with a radial movement component along a path 35 that will be described infra with reference to FIG. 4 in more detail. A radius 29 of the movement of the cutting tool 17 viewed in a direction of the rotation axis 6 of the shaft 2 is determined by a distance 30 between the rotation axis 6 of the shaft 2 and the cutting tool 17.

Figure 2:
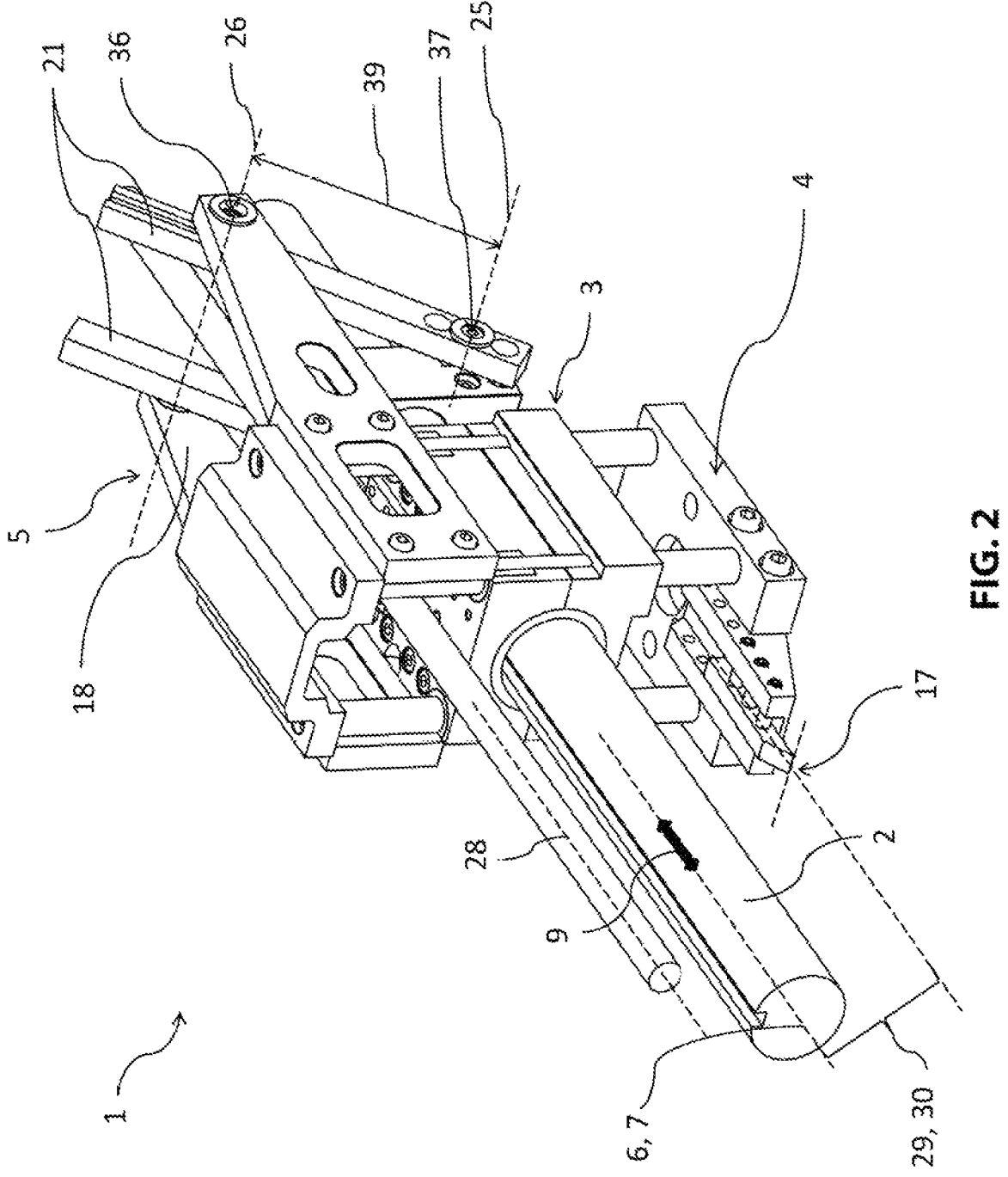
FIG. 2 illustrates the device according to FIG. 1 in a second operating position.

The coupling of the spindle 27 with the shaft 2 causes a rotation of the spindle 27. Due to the coupling of the spindle 27 with the nut of the carriage 3 a movement of the carriage 3 relative to the shaft 2 is caused in an axial direction 9 of the shaft 2. Thus, the carriage 3 is moved axially in a direction of the rotation axis of the shaft 2, whereas the spindle 27 remains in place. The movement of the carriage 3 occurs in a direction of the support block 19. Due to the coupling of the carriage 3 through the transmission elements 18 with the connection levers 21, the connection levers 21 are moved in the axial direction 9 of the shaft 2 and simultaneously moved perpendicular to the axial direction 9. Due to this movement a component of the movement of the connection levers 21 perpendicular to the rotation axis 6 of the shaft 2 is transmitted to the support rods 14 of the linear support 13. This causes a linear displacement of the tool support 4 relative to the rotation axis 6 of the shaft 2 of the device 1. This operating position is illustrated in FIG. 2. The axial displacement of the tool support 4 causes an increase of the distance 30 of the cutting tool 17 from the shaft 2.

Figure 3:
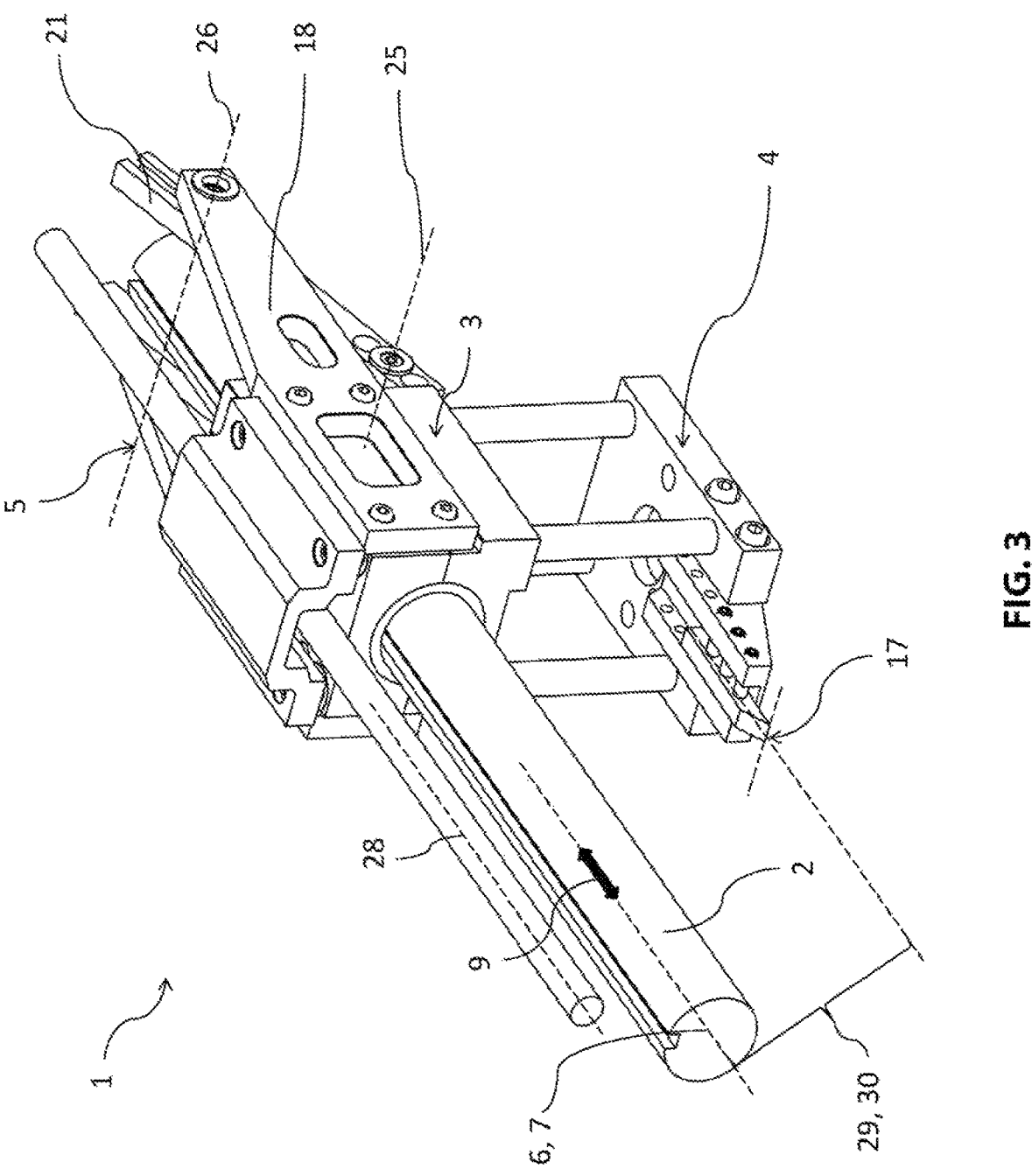
FIG. 3 illustrates the device according to FIG. 2 in a third operating position.

Further operation of the device 1 causes a continuous pulling of the carriage 3 along the shaft 2 in the axial direction 9 and therefore a corresponding increase of the distance 30 due to the forced coupling between the shaft 2, the tool support 4 and the carriage 3 as shown in FIG. 3. Thus, a maximum distance 30 is reached when the connection levers 21 are oriented parallel to the shaft 2 and the support plate 15 contacts a half shell 10 of the carriage 3.

Figure 4:
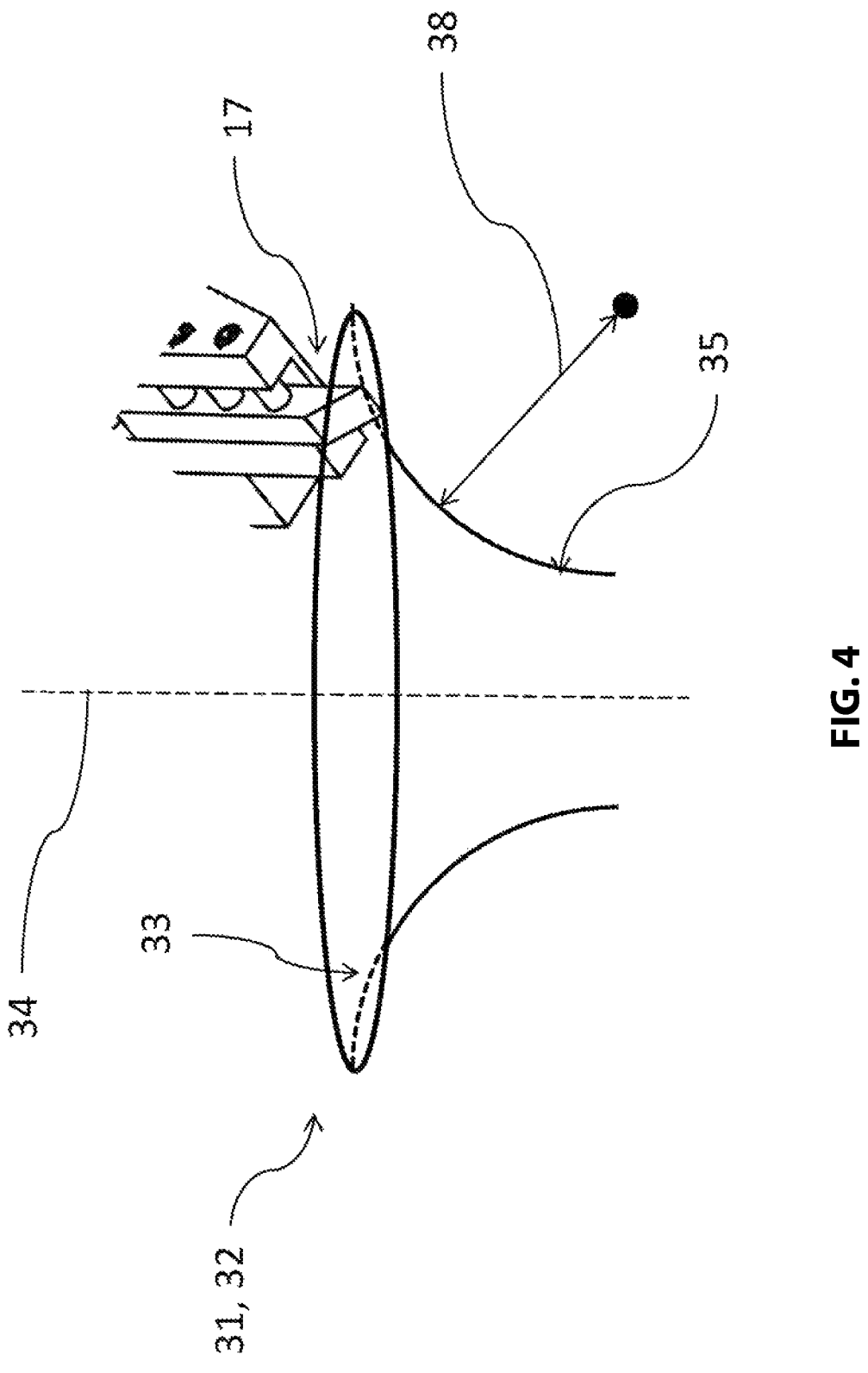
FIG. 4 illustrates a schematic detail of a cutting tool of the device according to the invention according to FIG. 1 and a work piece.

FIG. 4 shows the cutting tool 17 machining a work piece 31 configured as a valve 32. The device 1 is used for finishing a contact surface 33 of the valve 32 so that the valve 32 has a circular surface contour in a cross section parallel to a longitudinal axis 34 of the valve. Overall, the cutting tool 17 moves on a circular path 35 determined by the axial and radial movement components caused by the forced coupling. Thus, the cutting tool 17 follows a circular movement of a first anchoring point 36 of the transmission element 18 at the connection lever 21. A radius 38 of the movement path is thus determined by a distance 39 between the first anchoring point 36 and a second anchoring point 37 of the connection lever 21 at the half shell 20 of the support block 19.

Figure 5:
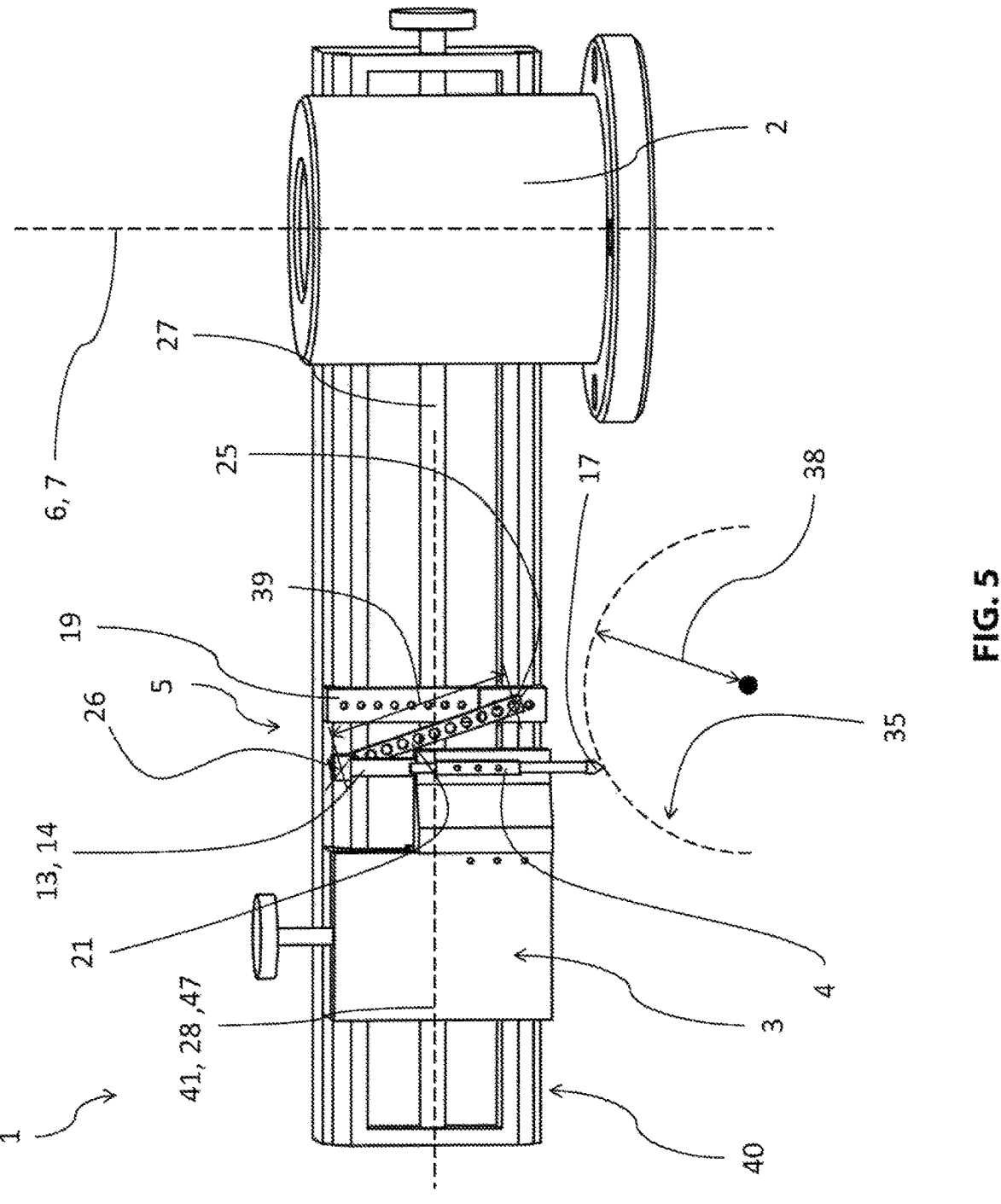
FIG. 5 illustrates a perspective view of a second embodiment of the device according to the invention.
Figure 6:
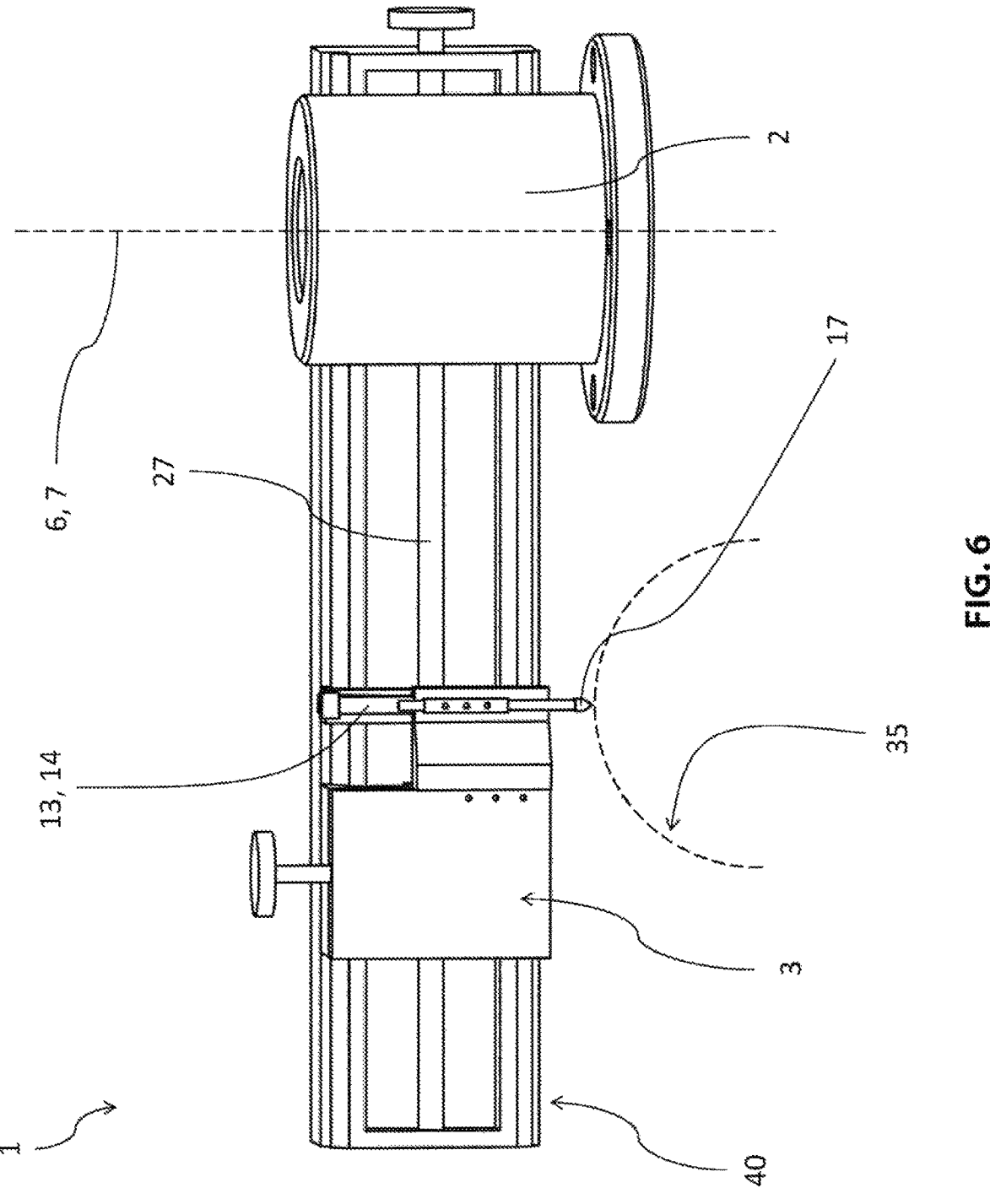
FIG. 6 illustrates the device according to FIG. 5 in a second operating position.
Figure 7:
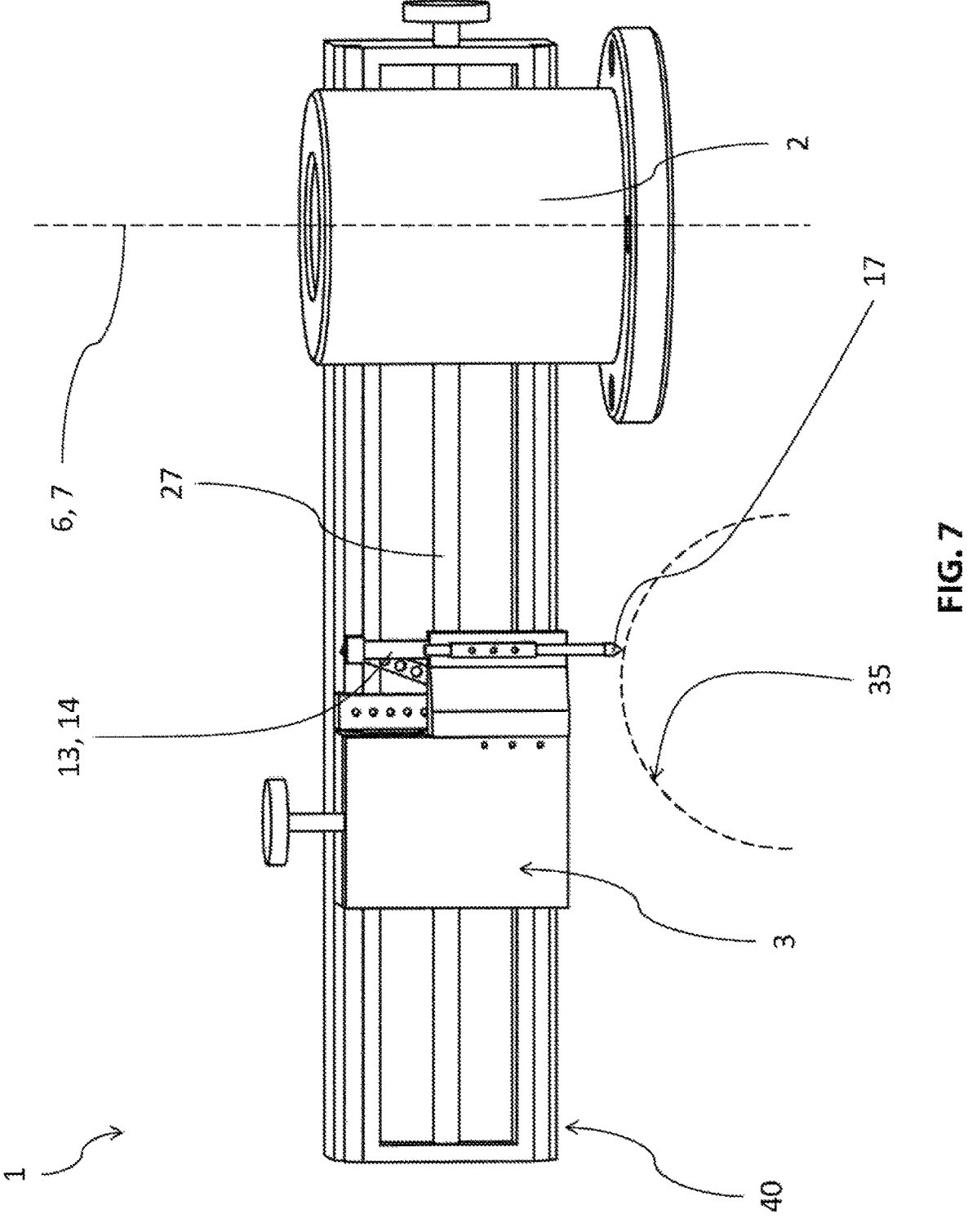
FIG. 7 illustrates the device according to FIG. 6 in a third operating position.

FIGS. 5-7 show a second embodiment of the device 1 according to the invention. The device 1 according to this additional embodiment differs from the first embodiment in that the carriage 3 of the device 1 is displaceable radially and not axially with respect to the rotation axis 6 of the shaft 2 which differs from the device 1 illustrated in FIGS. 1-4.

The second device 1 also includes a shaft 2, a carriage 3, a tool support 4 and a transmission 5. The shaft 2 is thus rotatable about a rotation axis 6 wherein the rotation axis 6 of the shaft 2 is also the longitudinal axis 7 of the shaft 2.

The device further includes a pivot arm 40 that arranged perpendicular to the shaft 2 and that is connected in a non-movable manner with the shaft 2 so that a rotating movement of the shaft 2 about its rotation axis 6 is transmitted to the pivot arm 40.

The carriage 3 of the device 1 is arranged at the pivot arm 40 and displaceable in an axial direction of a longitudinal axis of the pivot arm 40. The transmission 5 of the device 1 also includes a linear support 13 and a connection lever 21. The linear support 13 includes a support rod 14 that is coupled with the carriage 3 of the device 1 and wherein a cutting tool 17 configured as a turning steel for machining metal is arranged at an end of the carriage 3. The connection lever 21 is pivotable at one end about a first pivot axis 25 at a support block 19 of the device 1 wherein the support block 19 is fixed non-movable at the pivot arm 40 and the connection lever is coupled at a second end at the support rod 14 of the transmission 5 and rotatable about a second pivot axis 26. The pivot axes 25, 26 of the connection lever 21 are thus oriented perpendicular to the rotation axis 6 of the shaft 2 and perpendicular to the longitudinal axis 41 of the pivot arm 40.

The device 1 further includes a spindle 27 that is rotatably supported about its longitudinal axis 28. The spindle 27 is coupled with the shaft 2 by suitable devices so that the spindle 27 also performs a rotating movement caused by the rotation of the shaft 2. Furthermore, the spindle 27 is coupled with the carriage 3 of the device 1 by a nut. A rotation of the spindle 27 causes a linear displacement of the carriage 3 along the longitudinal axis 41 of the pivot arm 40.

In one operating condition after device 1 the shaft 2 is caused to rotate by a drive. Due to the torque proof connection of the carriage 3 and of the support block 19 at the shaft 2 all components rotate about the rotation axis 6 of the shaft 2. Thus, the tool support 4 and the cutting tool 17 are moved with an axial movement component along a path 35. A radius 38 of the path 35 is determined by a distance 39 between the rotation axis 25, 26 of the connection lever 21.

The coupling of the spindle 27 with the shaft 2 causes a rotating movement of the spindle 27 which causes the carriage 3 to move along the longitudinal axis 41 of the pivot arm 40 and thus in a radial direction relative to the shaft 2. The carriage 3 thus moves as a function of a direction of rotation of the shaft 2 back and forth along the rotation axis 6 of the shaft 2.

Thus, the connection lever 21 is moved in the longitudinal direction 41 of the rotation arm 40 due to the coupling of the carriage 3 with the connection lever 21. Due to this movement a component of the movement of the connection lever 21 parallel to the rotation axis 6 of the shaft 2 is transferred to the support rod 14 of the linear support 13. This causes a linear displacement of the tool support 4 in a direction of the rotation axis 6 of the shaft 2 of the device 1. Due to the displacement of the tool holder 4 a distance between the cutting tool 17 and a work piece that is to be machined is reduced as evident from FIGS. 5 and 6.

Further operation of the device causes a continuous pulling of the carriage 3 along the longitudinal axis 41 of the pivot arm 40 and thus a corresponding reduction of the distance as illustrated in FIG. 6 due to the forced coupling between the shaft 2, the tool support 4 and the carriage 3. A minimum distance is reached when the connection lever 14 is oriented perpendicular to the longitudinal direction 41 of the pivot arm 40. During further movement of the shaft 2 and thus of the tool support 4 the tool support 4 is moved towards the work piece after reaching a maximum position where the distance is smallest. Overall, the tool support 4 performs a radial and an axial movement wherein the path 35 of the tool support 4 is circular wherein a radius 38 of the path 35 corresponds to a distance 39 between the first rotation axis 25 and the second rotation axis 26 of the connection lever 21.

Figure 8:
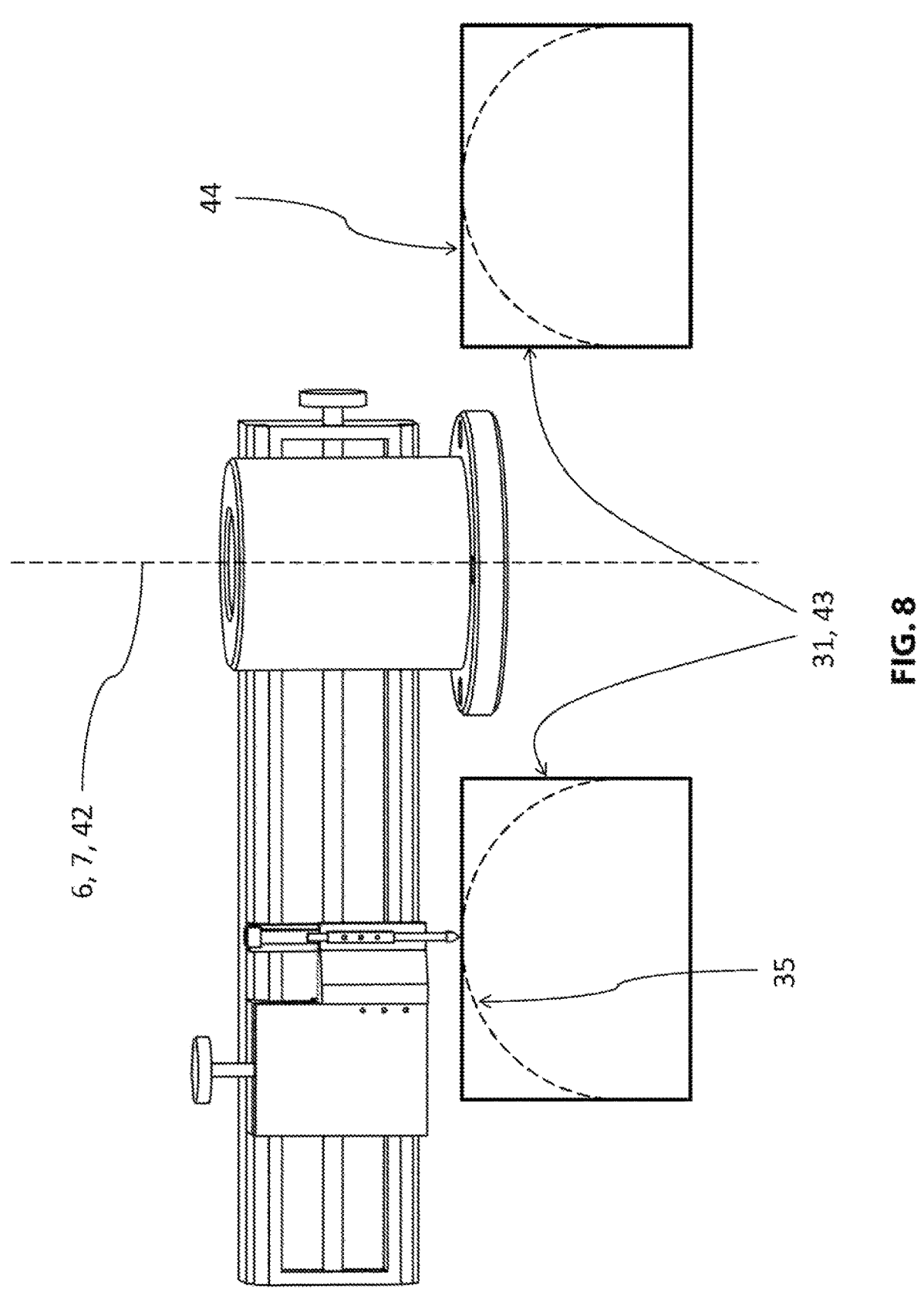
FIG. 8 illustrates the device according to FIG. 5 and a work piece.

FIG. 8 illustrates the device 1 while machining a work piece 31 configured as a flange 43. The shaft 2 of the device 1 is arranged in the flange 43 by suitable devices so that the rotation axis 6 of the shaft 2 coincides with a longitudinal axis 42 of the flange 43. The goal of the machining is to fabricate a surface 44 of the flange 43 along a circumference of the flange 43 so that the surface 44 is configured semi-circular in top view. A face of the work piece 31 is shaped as a half-torus after machining.

Figure 9:
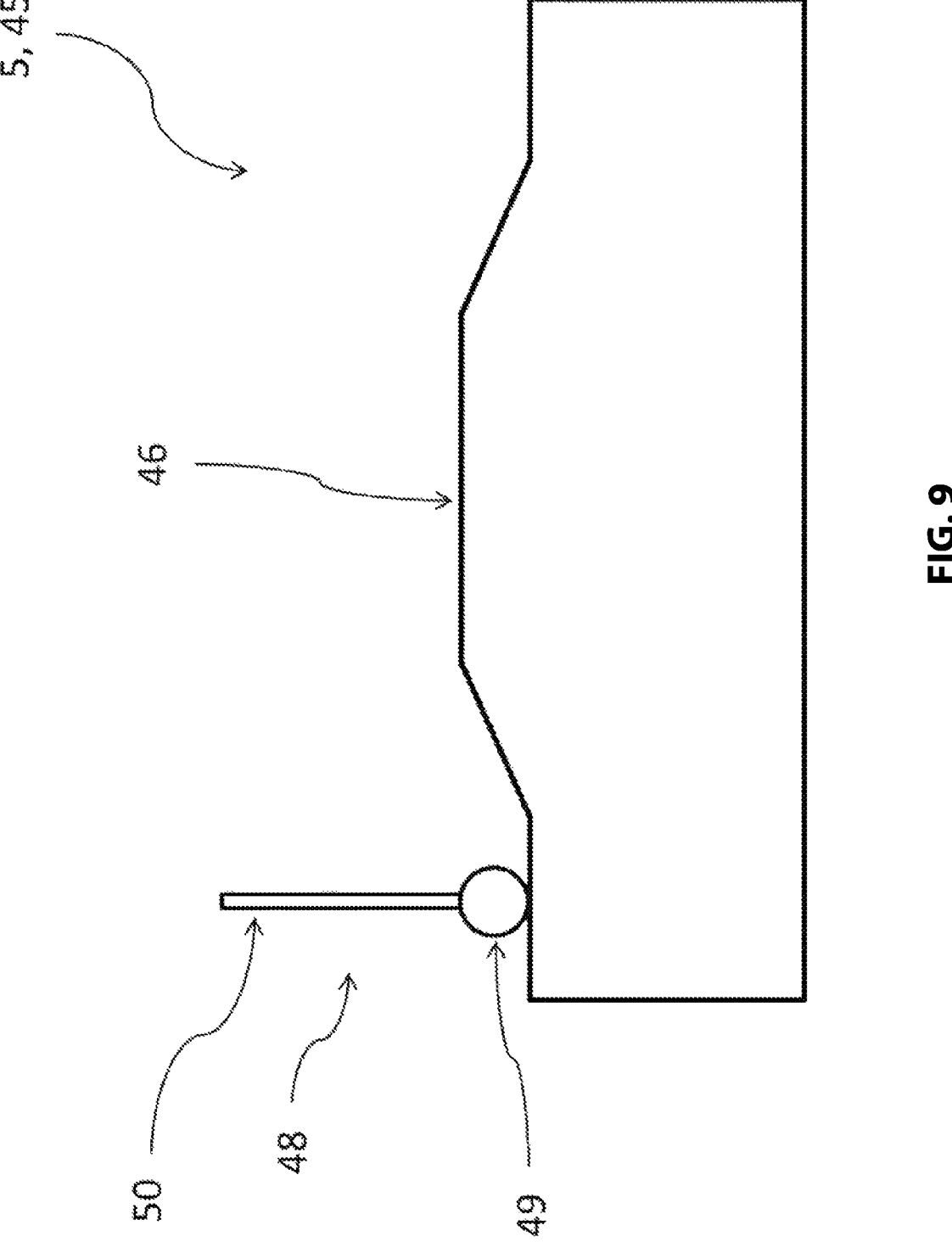
FIG. 9 illustrates a front view of another embodiment of a slotted link of a transmission.

FIG. 9 illustrates another configuration of a transmission 5 of the device 1. Thus, the transmission 5 includes slotted link 45. Thus, the slotted link 45 includes a contour 46 to be transferred to a work piece 41 wherein the cutting tool 17 is run along the contour 46. Thus, the device 1 includes a support element 48 including a spherical contact element 49 which is preloaded e.g. by a spring against the slotted link 45 and a support arm 50 connected thereon. Thus, the support arm 50 is coupled with the support rod 15 so that a movement of the contact element 49 along the contour 46 of the slotted link 45 is transferred to the tool holder 4 and thus to the cutting tool 17. Due to a coupling of the carriage 3 with the rotating movement of the shaft 2 the cutting tool 17 is moved towards the shaft 2 or away from the shaft 2 depending on the direction of rotation of the shaft 2, while the cutting tool 17 is automatically run along the contour 46 so that the contour 46 is transferred to the work piece 31 during machining.

Figure 10:
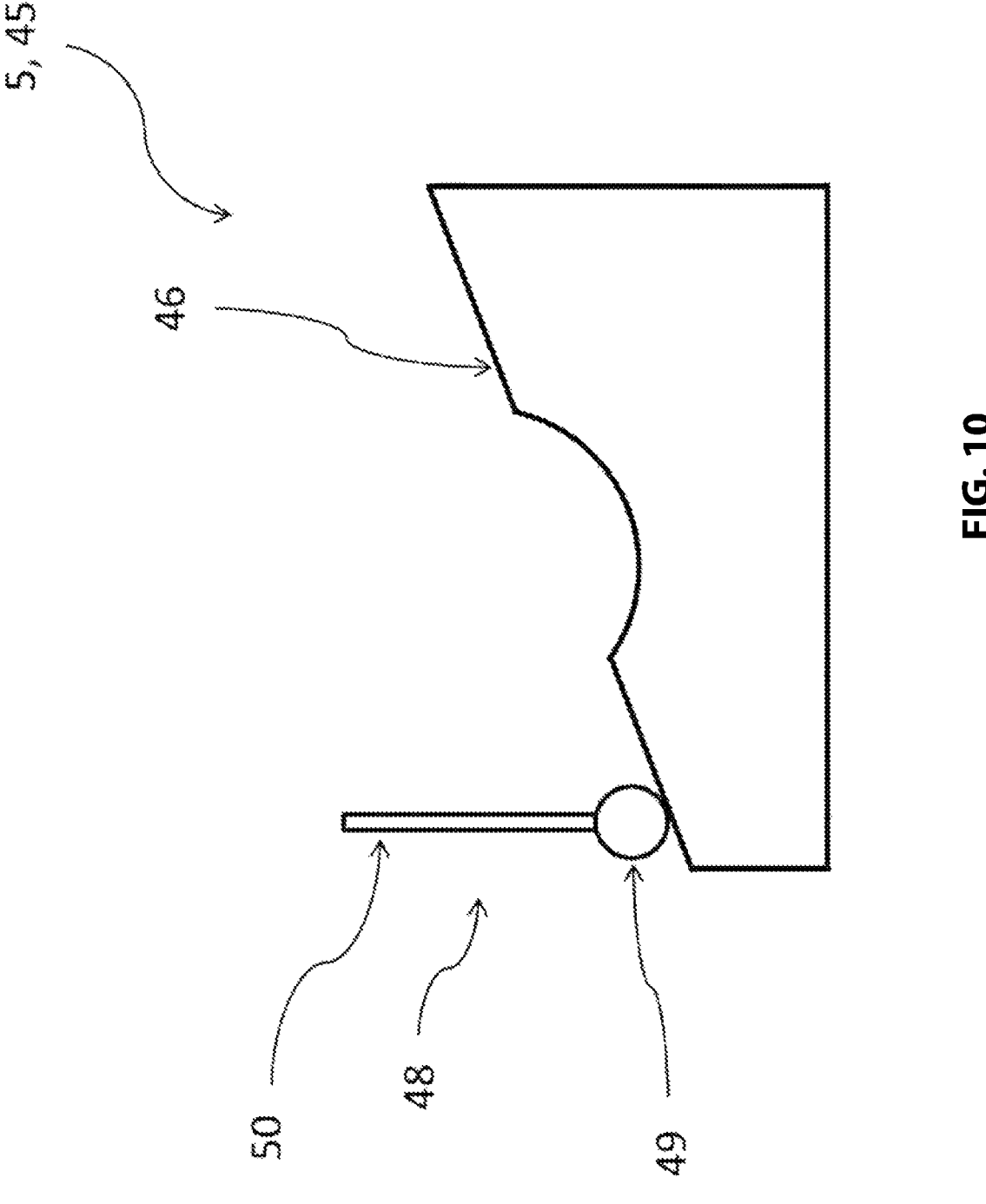
FIG. 10 illustrates a front view of another embodiment of a slotted link.

FIG. 10 illustrates another embodiment of the slotted link 45. The contour 46 of the slotted link 45 is thus suitable for machining a work piece 31 that is to be provided with a notch along a circumference.

REFERENCE NUMERALS AND DESIGNATIONS 1 mobile device
2 shaft
3 carriage
4 tool support
5 transmission
6 rotation axis
7 longitudinal axis
8 groove
9 axial direction
10 half shell
11 half shell
12 pass through bore hole
13 linear support
14 support rod
15 support plate
16 receiving element
17 cutting tool
18 transmission element
19 support block
20 half shell
21 connection lever
22 pass-through bore hole
23 groove
24 bolt
25 rotation axis 26 rotation axis
27 spindle
28 longitudinal axis
29 radius
30 distance
31 workpiece
32 valve
33 contact surface
34 longitudinal axis
35 path
36 support point
37 support point
38 radius
39 distance
40 pivot arm
41 longitudinal axis
42 longitudinal axis
43 flange
44 surface
45 slotted link
46 contour
47 carriage axis
48 support element
49 contact element
50 support arm

What is claimed is:

1. A mobile device for machining a workpiece, the mobile device comprising:

a shaft rotatable about a rotation axis corresponding to an axis of the workpiece;

a carriage supported on the shaft and axially guided in an axial groove of the shaft, the carriage is rotatably fixed to the shaft and axially displaceable along the rotation axis;

a tool support for a cutting tool, the tool support connected to the carriage by a linear support, the linear support includes a first support rod arranged on one radial side of the shaft and a second support rod arranged on an opposite radial side of the shaft, each of the first and second support rods is supported within a respective through hole in the carriage, the tool support is attached to a respective first end of the first and second support rods, an opposing respective second end of each of the first and second support rods is attached to a support plate, and the tool support is displaceable relative to the carriage in a direction perpendicular to the rotation axis;

a mechanical continuous transmission includes the linear support, a first transmission arm arranged on the one radial side of the shaft and mounted on the first support rod, a second transmission arm arranged on the opposite radial side of the shaft and mounted on the second support rod, a first connection lever, and a second connection lever; and a support block rotatably fixed to the shaft, the carriage is movable axially along the shaft relative to the support block, wherein each of the first connection lever and the second connection lever is pivotably connected at a respective first end to the support block, the first connection lever is pivotably connected at a second end to the first transmission arm, and the second connection lever is pivotably connected at a second end to the second transmission arm, and wherein any axial movement of the carriage along the shaft causes a radial movement of the tool support perpendicular to the shaft via the linear support such that the cutting tool is moved in a curved path.

2. The device according to claim 1, further comprising:

a spindle that cooperates with a nut that is connected to the carriage, wherein the spindle runs parallel to the shaft and is rotatable about a longitudinal axis of the spindle so that a movement of the carriage relative to the shaft is generatable in an axial direction of the shaft from a rotation of the spindle that axially displaces the nut.

3. The device according to claim 1, wherein the carriage comprises two half shells that respectively envelop half of the shaft and that are connected with each other by fastening elements in a disengageable manner.

4. The device according to claim 1, wherein the support block comprises two half shells that respectively envelop half of the shaft and that are connected with each other by fastening elements in a disengageable manner.

* * * * *